United States Patent [19]
Whitehead, Jr. et al.

[11] 3,780,588
[45] Dec. 25, 1973

[54] DIFFERENTIAL PRESSURE RESPONSIVE APPARATUS

[75] Inventors: Robert C. Whitehead, Jr.; Lester R. Leidy, Jr., both of Oreland, Pa.

[73] Assignee: Honeywell Inc., Minneapolis, Minn.

[22] Filed: Mar. 31, 1972

[21] Appl. No.: 240,100

[52] U.S. Cl. .......................... 73/398 AR, 73/407 R
[51] Int. Cl. ............................................. G01l 9/06
[58] Field of Search ................... 73/398 AR, 398 C, 73/407 R, 88.5 SD

[56] References Cited
UNITED STATES PATENTS

| | | | |
|---|---|---|---|
| 3,559,488 | 2/1971 | Weaver | 73/398 AR |
| 3,343,420 | 9/1967 | Kondo et al. | 73/398 AR |
| 3,400,588 | 9/1968 | O'Connor | 73/407 |
| 3,641,812 | 2/1972 | Vick | 73/88.5 SD |
| 2,977,991 | 4/1961 | Bauer | 73/407 |

Primary Examiner—Donald O. Woodiel
Attorney—Arthur H. Swanson et al.

[57] ABSTRACT

A flowmeter for converting differential high and low fluid pressure signals into an electrical signal includes a flexible compliance bellows and an overload valve actuating bellows. The high and low differential fluid pressure signals are applied respectively against the inner and outer surfaces of each of said bellows. A spring extends between the compliance bellows and a wafer made of a single crystal silicon material. The wafer includes a diffused fully active resistive bridge pattern thereon and is so arranged that distortion thereof caused by displacement of said compliance bellows results in unbalancing of said bridge and the production of the electrical signal. Adjustable stops are employed whereby the displacement of the compliance bellows is restricted to predetermined differential fluid pressure operating ranges thereby limiting the forces transmitted by the compliance bellows and spring to the wafer to a level below those tending to rupture said wafer.

10 Claims, 4 Drawing Figures

DIFFERENTIAL PRESSURE RESPONSIVE APPARATUS

BACKGROUND OF THE INVENTION

In order to measure the flow rate of a fluid it is necessary to take a differential fluid pressure measurement of the drop in pressure which occurs in this fluid as it flows through an orifice in a flow line. To do this it has heretofore been necessary to resort to bulky, differential pressure measuring devices, e.g., inverted bells whose bases are sealed off by a liquid in a tank and which are joined together at their outer closed ends by a beam that in turn is mounted for see-saw motion on a knife edge pivot bearing.

Many other similar bulky devices, e.g., ring balanced type flow meters that contain a liquid have been employed. The liquid in these meters is displaced by a differential pressure of a fluid under measurement that is on opposite sides of an orifice in a flow line and the ring rotates about a knife edge pivot bearing to indicate differential pressures which extend between e.g. the zero and fifty inches of water range or the zero and five inches of water pressure range.

PROBLEMS

One problem encountered in present day meters of the aforementioned type is that users of such meters are now requiring them to be provided with expensive jeweled parts to reduce friction and to be made more reliable, more compact, accurate and lighter, and more stable to reduce friction.

The aforementioned requirements are necessary because it takes only a very small amount of friction from any one or more parts of these bell jar or ring balanced type meters to produce an inaccurate pressure indication.

Since the construction of bell jar and balancing ring type meters do not allow redesign of their parts in order to reduce the size of these meters another type of meter construction is therefore required in order to achieve the previously mentioned more reliable, more compact, lighter, stable and accurate present day specification requirements for these meters.

SUMMARY OF THE INVENTION

One solution that has been found to eliminate the aforementioned problems is to employ a semiconductive wafer having a resistive bridge diffused in a doped piezoresistive pattern thereon as a sensor to sense changes occurring in the difference between separate high and low fluid pressures that are each applied to a different opposite side of a compliance bellows and which in turn is connected by way of a resilient member to the wafer.

Maximum use of the space within the meter is accomplished by mounting a bellows operated overload valve and the aforementioned compliance bellows in parallel relationship with one another so that a joint movement can take place in these bellows as will hereinafter be described in detail.

The use of a compliance bellows in the aforementioned uniquely constructed meter provides a correct output signal indication when an overload pressure condition is present in either the low or high fluid pressure side of the meter. Without the presence of a compliance bellows differential pressure measuring meters have heretofore been known to provide false output indications which would lead the operator to believe that the differential pressure he was measuring was in a normal operating range, where, in fact, a dangerous condition existed in which the fluid pressure on either the high or low side of the compliance bellows had reached an overload condition as is disclosed in the copending John A. Weaver et al. Patent No. 3,712,143.

Another desirable important feature which the unique transmitter disclosed herein employes is that the force exerted on the semi-conductor wafer is limited by adjustable stops. These stops are employed to limit the motion of the compliance bellows within a desired safe prescribed range of motion so that the force that the bellows actuating spring can apply to the semi-conductive wafer will never exceed a preselected level which could cause the wafer to rupture.

BRIEF DESCRIPTION OF THE DRAWINGS

A better understanding of the present invention may be had when the following detailed description is read in connection with the accompanying drawings in which.

A DETAILED DESCRIPTION

Figure 1:
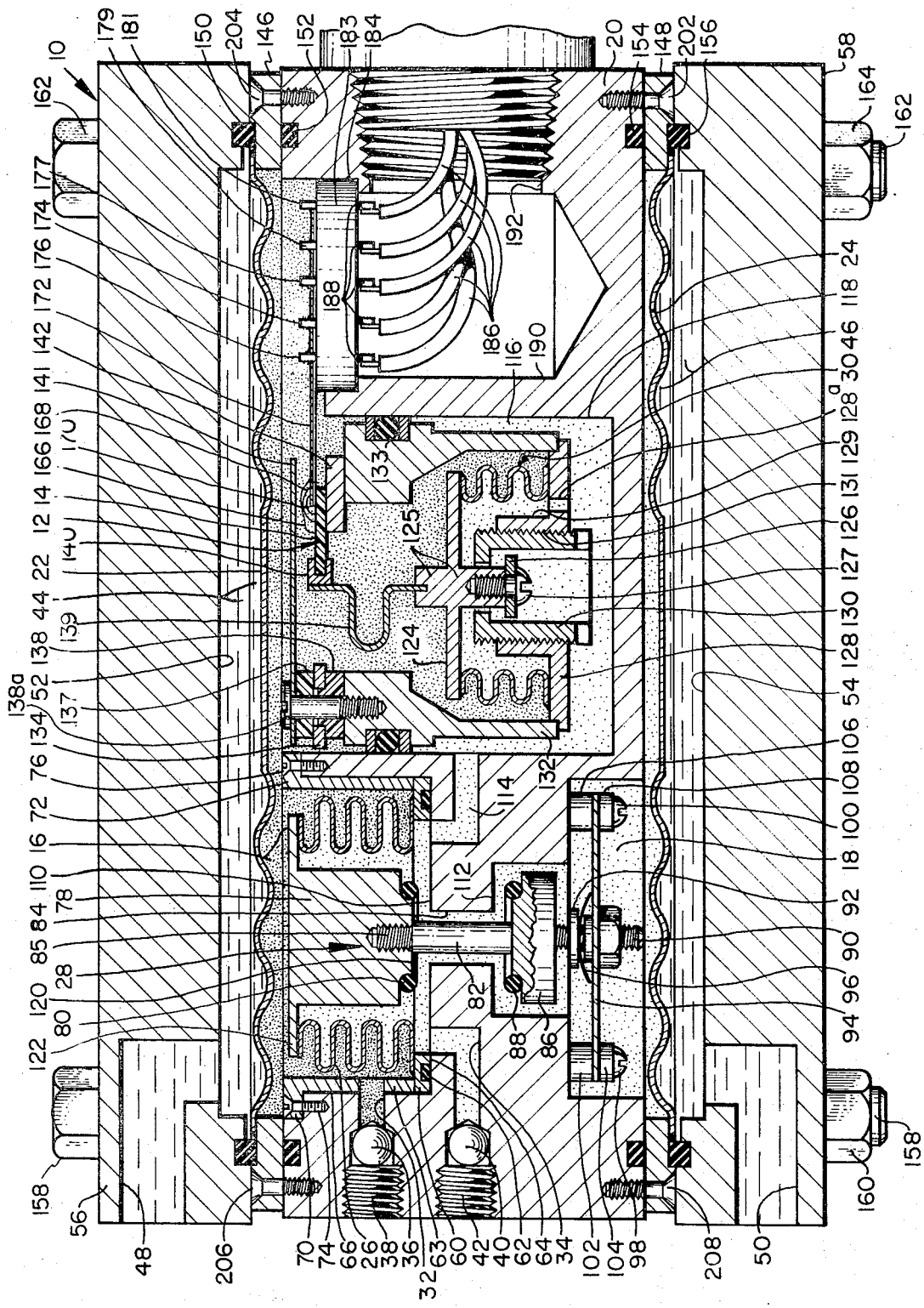
FIG. 1 shows a sectional view taken through one form of the differential pressure sensing meter in which the wafer is of a beam shaped configuration and a U-shaped spring is employed as a displacement to force converting means between the compliance bellows and the wafer and also shows how adjustable, wafer protecting stops are employed to selectively restrict the range of motion through which the bellows can be displaced.

FIG. 1 shows a pressure sensing apparatus 10 having a pressure-sensor 12 that is a wafer and which is made of single crystal silicon material into which has been diffused a fully active resistive wheatstone bridge pattern 14.

A high pressure fluid 16 and low pressure fill fluid 18 both of which are in the form of an incompressible nonconductive liquid are shown retained within the body 20 of the meter 10 and between high and low barrier diaphragms 22, 24 that are matched in size and stiffness to minimize the effect of temperature and static pressure.

The aforementioned fill fluids 16, 18 are shown positioned to apply fluid pressures that are in opposition to one another to opposite sides of a flexible overload bellows 26 which forms a portion of the high pressure overload valve 28.

The aforementioned fill fluids 16, 18 are also shown applying pressures that are in opposition to one another to opposing sides of the overload compliance bellows 30.

Ports 32, 34 shown on the left side of the body 20 are provided through which the aforementioned fill fluids 16, 18 are applied to fill the interior of the meter 10 while air is evacuated from the meter 10.

After filling the meter 10 with the fill fluid 16, 18 ball seal and plug units 36, 38; 40, 42 are then inserted into the outer ends of the ports 32, 34 of the body 20 to completely seal off the fill fluids retained within the interior of the meter 10 from atmospheric pressure.

High and low process fluid pressures 44, 46 whose differential pressure is to be measured are applied by way of their respective passageways 48, 50 and chambers 52, 54, formed by the high pressure heads 56, 58 and their separately associated diaphragms 22; 24.

The outer open end of the flexible bellows 26 of the high pressure overload valve 28 is shown fixedly connected, for example, by a solder to the inner wall of the ring shaped spacer 60. The lower flat surface of this ring 60 is retained in fixed relation witn an O-ring seal 62 and a surface forming the base 64 of a cylindrically bored out aperature wall 66 formed in the body 20 of the meter 10 by means of a sleeve shaped spacer 68 and associated retainers 70, 72.

These retainers 70, 72 are shown fixedly connected to the top portion of the body 20 by means of threaded screw connections 74, 76.

The closed end of the overload bellows 26 has a cylindrical T-shaped block 78 extending downwardly therefrom and has a resilient O-ring 80 retained in extending relationship therewith at its lower end.

The lower portion of this overload valve 28 has a rod 82 that extends in an upward direction in spaced apart relationship through a passageway 84 formed in the body 20 of the meter 10. The upper end of the rod 82 is shown threadedly connected at 85 to the center of the lower portion of the cylindrical block 78 for joint movement therewith.

A cylindrical block 86 forms an integral central portion of the rod 82 which has a resilient O-ring 88.

The lower end of the rod 82 has a threaded end portion 90 on which there is threadedly mounted a hub portion 92. An S-shaped spring 94 is mounted on the hub portion 92 and held in fixed relation thereon by means of a cup shaped spring washer 96. This washer 96 is of the type having a radial slot for rapid assembly into the position as shown in FIG. 1. The outer ends of this S-shaped spring 94 are retained by means of two screw threaded connections 98, 100 and associated spacers 102, 104; 106, 108.

When the head part of hexagonal hub portion 92 is rotated in one direction, it will cause the O-ring 80 and the parts associated therewith to be moved to an adjustably fixed operating position in a downward direction from the position shown and when it is rotated in the opposite direction it will cause the O-ring 80 to be moved to a different adjustably fixed operating position in an upward direction from the position shown.

The aforementioned adjustment is for the purpose of allowing an operator to select the pressure level at which either the overload high or low pressure fluid under measurement 44, 46 and its associated fill fluid 16 or 18 can close the overload valve 28.

During the normal non-overload condition the O-rings 80 and 88 will remain in spaced apart relation with respect to their associated seats 110, 112.

During an abnormal high pressure overload condition the pressure of the high pressure fluid 44 under measurement is raised to an abnormally high pressure level that is beyond the normal high pressure operating range of the meter 10.

This abnormal increase in the pressure of the high pressure fluid 44 is applied to the high pressure barrier diaphragm 22, to the fill liquid 16 and to the overload bellows 26. This action will cause the bellows 26 and the block 78 attached to the upper end of the bellows 26 and the O-ring 80 connected thereto to move in a downward direction until the O-ring 80 is brought into an initial substantially non-deformable seal tight contact with the seating surface 110 as is best shown in FIG. 1.

This initial sealing action traps a portion of the low pressure fill fluid 18 inside bellows 26, passageway 34, 114, the passageway 116 between the bored out cylindrical wall 118 and the inner wall of the compliance bellows 30, and within the space formed by the internal surface of the bellows 30. The pressure of the trapped volume of the relatively incompressible fluid 18 is therefore initially raised to effect a lowering of the differential pressure acting across the compliance bellows 30 as the initial abnormal change in the high pressure fluid 44 and the high pressure fill fluid 16 occur. This pressure negating action thus prevents the increase of the high pressure fill fluid 16 from rupturing the compliance bellows 30.

During the movement of the overload valve 28 from the substantially non-compressed sealed position of the O-ring 80 to a compressed sealed position with seating surface 110 a reduction in the volume of the trapped low pressure fluid fill 18 that is within the overload bellows 26 will take place. Under this latter mentioned condition the magnitude of the pressure of the high pressure fluid 44 and the high pressure fluid 16 is sufficiently high to cause the overload bellows 26 to be compressed and its associated block on which the O-ring 80 is mounted to move in a downward direction and the O-ring to be deformed and brought into fluid seal tight engagement with sealing surface 110. The base portion 120 of the metal block 78 under the latter mentioned condition is seated against the metal seating surface 110 of the body 20. While the aforementioned compression of the bellows 26 and O-ring seal 80 takes place, a decrease in the volume of the low pressure liquid fill 18 within the overload bellows 26 will also occur as the overload bellows, including its solid cylindrical end portion 122, is moved in a downward direction in a piston-like manner. This piston-like effect will thus occur during the downward movement of the bellows and while its convolutions are being brought into more compact relationship with one another.

More specifically, it should be noted that while the O-ring 80 is being squeezed and it is simultaneously moved between its non-compressed to its compressed sealed with the sealing surface 110, the top of the bellows 26 will move the same distance as the amount this O-ring 80 is squeezed, since these parts are rigidly connected. It should further be noted, since the area of the bellows 26 is greater than that of the O-ring 80, a change in the volume of the trapped fluid results. This change in volume would normally cause an excessive change in pressure, but this is prevented by the expansion of the compliance bellows 30.

FIG. 1 also shows a plate 124 forming the top of the compliance bellows 30 as having a boss 125 extending upwardly away from and downwardly into a central portion of the bellows 30.

The bottom portion of the boss 125 has a stop plate 126 fixed thereto by means of a threaded screw member 127. The stationary base portion 128 of the compliance bellows 30 has a tubular portion 129 extending upwardly therefrom for supporting an adjustable stop member 130 in a selected position thereon by means of the threaded connection 131 formed between these parts. The internal wall of the tubular portion 130 forms a passageway through which the fluid 18 passes into the interior of the bellows 30.

The base 128 of the bellows 30 is fixedly connected by solder to the lower end of the hollow cylindrical support block 132. A passageway 128a is formed therein to allow free flow of the fluid 18 into and out of the bellows 30.

The support block 132 supports a sandwich type seal 133, comprised of an O-ring positioned between two rings made of a material trademarked Teflon, in its upper external wall surface. This seal 133 extends between the block 132 and the cylindrical wall 118 and forms a seal between the high pressure fluid 16 located in the upper portion of the meter 10 and the low pressure fluid 18 located at the bottom portion of meter 10.

Figure 2:
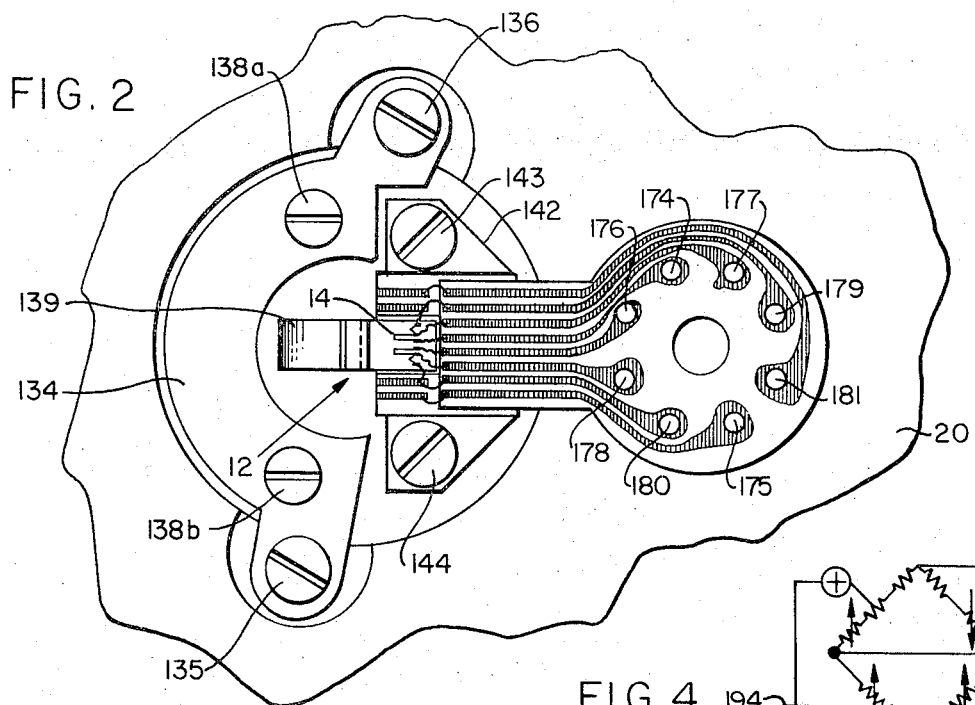
FIG. 2 shows a plan view of FIG. 1 and how electrical jump wires are employed to connect the diffused fully active resistive bridge on the silicon wafer with an electrical head frame connection.

As is best shown in FIGS. 1 and 2 the block 132 is supported in fixed relationship on the body 20 of the meter 10.

This is accomplished as shown in FIG. 2 by means of a hold down strap 134, positioned in the top recessed wall portions of the body 20 and a pair of threaded screw connections 135, 136 passing through the strap 134 into the top wall portion of the block 132. A pair of insulators e.g. 137, 138 mounted on each of the screw connections 138a, 138b along with the back up rings of seal 133 are employed, as shown in FIG. 1, to electrically isolate the bellows 30, a U-shaped spring connection extending between the boss 125 and the U-shaped member 140 connected by brazing to the spring 139, the wafer 12 and the semi-conductor wafer 12 from the meter body 10. This construction prevents leakage current from passing from the wafer to ground.

A suitable metal shield 141 is retained as is best shown in FIG. 1, 138a, 138b, to the support block 132 by screw connections. This shield 141 as shown in FIG. 1 is connected electrically to the substrate of semi-conductor wafer beam 12 to prevent drift of the beam outward due to a condensor effect taking place between the fluid 16 and the barrier diaphragm 22.

The beam shaped semi-conductor wafer 12 is in turn connected by a gold bonding material to a plate 142 which plate in turn is connected to the top of the support block 132 by the screw connection 143, 144.

From the aforementioned description of the elements it can be seen that as the high and low pressure of the respective process and fill fluids 44, 16; 46, 18 apply varying pressures to the opposite sides of the compliance bellows 30 the bellows 30 will be displaced in a vertical up and down direction. The movement resulting from this displacement will be transmitted by way of the U-shaped spring 139 into a resulting force that is applied by way of the connection 140 to the semi-conductor silicon beam 12. The gradients selected for the spring 139 and bellows 30 and the proper selected threadedly adjusted position for the stop 130 are such that the meter can be set so that it can transmit only desired forces to the semi-conductor beam 12. These forces will lie within a desired safe rnage of force levels that will not exceed any ultimate force level that would rupture the wafer 12 and cause the electrical signal transmitting characteristics of the resistive bridge portion thereon, 14, to be impaired.

It should be noted that the two heads 56, 58, the centrally located body 20 and the support plates 146, 148 to which the barrier diaphragms 22, 24, are fixedly attached are of a substantially square shaped configuration.

Furthermore, the heads 56, 58, body portion 20 and support plates 146, 148 are connected in fluid seal tight relationship with one another as a single unit by means of suitable O-ring seals 150, 152, 154, 156 and with the aid of a suitable number of bolt and nut connections, for example, 158, 160; 162, 164.

It should also be noted that a suitable number of fine wires, for example, 166, 168, 170 are connected as jump wires to an electrical head frame 172 between the active resistive bridge 14 formed on the silicon semi-conductor wafer 12 and upper multi-pin connections 174, 175, 176, 177, 178, 179, 180, 181 of a cylindrical feed through header 183. This header 183 in turn is shown in sealed fluid tight engagement with the cylindrical bored out wall 184 formed in the body 20.

Additional leads 186 which may be mounted in the form of another flexible cable are connected to the lower multi-pin connections 188 of the feed through member 183 and passing downwardly through the cylindrical bored out portion 190 in the body 12 and extending outwardly through a cylindrically bored out port 192 formed on the right side of the body 12.

Figure 4:
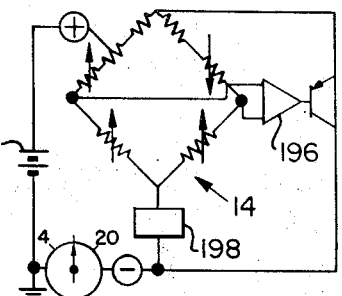
FIG. 3 shows a sectional view taken through another form of a differential pressure sensing meter in which the wafer is an upper wall of a chamber and a coil shaped spring is employed as a displacement to force converting means between the compliance bellows and the wafer and also shows how adjustable wafer protecting stops can be employed to selectively restrict the range of the motion through which the bellows can be displaced and FIG. 4 shows the electrical bridge employed to produce an electrical signal that is responsive to the magnitude of the differential fluid pressure under measurement.

FIG. 4 shows that the fully active resistive wheatstone bridge pattern 14, previously referred to under the description of FIG. 1, receives power from a power source 194 that is external to the meter 10 shown in FIG. 1.

FIG. 4 shows that an output of the temperature compensated amplified unit 196 and the constant current regulator 198 is provided for the bridge 14 that is external to the meter 10.

A more thorough detailed description of the amplifier unit 196 and how it is interrelated with the output of the bridge 14 to provide temperature compensation can be obtained by referring to the Anthony M. Demark Patent application, Ser. No. 62,868 filed Aug. 11, 1970.

An electric ammeter 200 is employed in the output of the bridge circuit 14 for indicating changes in the magnitude of the differential pressure being applied across the pressure sensor 12 as shwon in FIG. 1 in terms of electrical units, for example, 4 to 20 milliamps which is equivalent to the 0 to 100 percent normal operating range that is selected for the meter 10.

If the previously described pressure of the high pressure fluid 44 and its related high pressure fill fluid 16 attempts to exceed a normal operating pressure value the overload valve 28 will begin to move in a downward direction toward its closed or in a non-compressed engagement with seating surface 110.

As the pressure on the sensor 12 increases due to an increase in the high pressure of the fluid acting on the top of the compliance bellows 30 to compress it, the output of the sensor continues to increase until the overload valve 28 completes its previously mentioned fluid compressing piston-like movement or until it reaches a position in which the convolutions at the top of the overload bellows are brought into more compact nestled down relation with one another.

It should be noted that if a compliance bellows 30 is not used, and an abnormally high fluid pressure 44 and its accompanying high fluid filled pressure 16 is present, then a meter measuring the output of the sensor would erroneously indicate that the meter 10 was being operated within the normal 0 – 100 percent scale range of the meter 10 or operating at a level which is below this range.

It should also be noted that the compliance bellows 30 will enable a true reading to occur on the differential pressure measuring gage 200 only when the differential pressure being sensed by the sensor 12 is in fact within the normal 0 to 100 percent operating scale of the meter 10.

If the compliance bellows 30 is not used then an overload pressure condition on the low pressure side of the meter 10 occurs and the operator is erroneously shown the value of the sensor output as being in the normal operating range and at a range that is higher than the 100 percent operating range value rather than showing him that the true value of the overload pressure is in fact below the operating range of the meter 10.

Since a compliance bellows 30 is provided when this overload pressure condition occurs, the output of the sensor 12 will remain above the 100 percent non indicating level.

A suitable number of threaded connections which may be in the form of flat head machine screws, for example, 202, 204, 206, 208 are shown spaced about and passing through each of the support plates 146, 148 and body 20 to retain the high and low fill fluids 16, 18 in sealed fluid tight relationship between the barrier diaphragms 22, 24.

Therefore, when the nut and bolt connections, for example, 158, 160; 162, 164 and the heads 56, 58 are removed from the external surface of the support plate 146, 148 the barrier diaphragms 22, 24 which have their peripheral portions welded to their associated support plates 146; 148 will form a unitary fluid tight unit. This unit in turn contains modular parts e.g. 136 that can readily be removed and replaced with another module. Such a meter construction affords a very rapid way in which the meter 10 can be repaired and therefore will reduce the downtime loss in production that is necessitated when such a repair is required.

Figure 3:
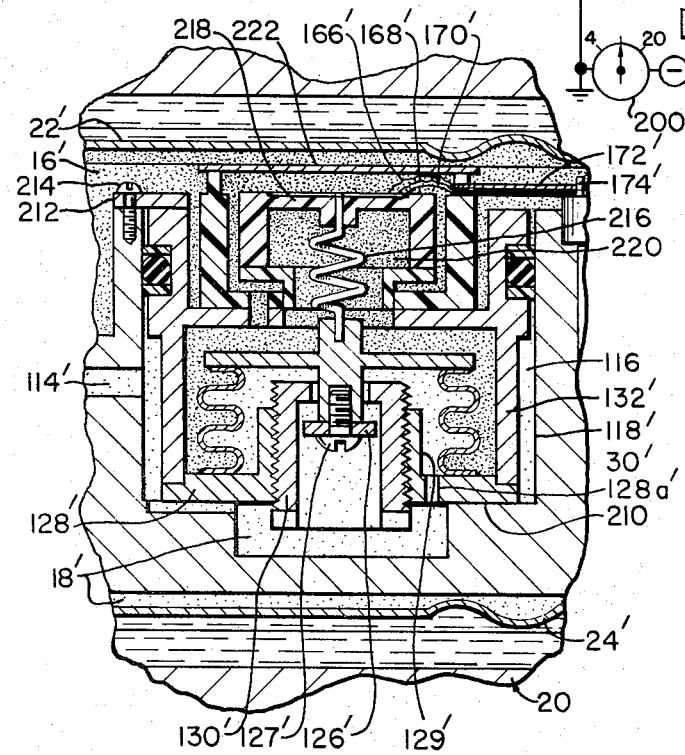

The overload compliance bellows assembly 30' and its associated parts such as its stop member 130' shown in FIG. 3 is similar to and functions in substantially the same manner as that already described for the same named parts under the description of FIG. 1.

The main difference is that the base 128' of the cylindrical support block 132' is mounted on a cylindrical bored out base portion 210 of the meter body 20 and is retained in this position by a suitable number of spaced apart threaded screw connections and holding down straps such as the hold down strap 212 and the threaded screw connection 214.

Another difference which the apparatus shown in FIG. 3 discloses over that shown in FIG. 1 is that the spring 216 is of a coil spring configuration in FIG. 3 rather than being of the U-shaped configuration 139 as shwon in FIG. 1.

Still another difference is that the semi-conductor wafer 218 forms an upper circular wall of chamber 220 to which the upper end of the coil spring 216 is fixedly connected and acts as a force loaded plate rather than being in the form of a cantilever beam as shown in FIG. 1.

A shield 222 fixedly mounted on the top surface of the cylindrical support block by a suitable epoxy or other cementing material is employed which performs the same function as that already described for the shield 141 of FIG. 1.

The other remaining parts having primes after the reference numerals shown in FIG. 3 are merely to identify the parts already described in FIG. 1 which perform the same function as those parts in FIG. 1.

The embodiments of the invention in which an exclusive property or privilege is claimed are defined as follows:

1. A transducer, comprising a meter body having cavities in spaced apart walls thereof, a pair of opposied diaphragms each connected to a different one of said spaced apart walls and extending in spaced apart relationship over the cavities contained therein to form a fluid tight cover for the spaced apart walls of the meter body, a first flexible member within a first one of said cavities, forming a first chamber, a second flexible member forming a second chamber within a second one of said cavities, said first and second chambers being adjacent to and spaced from a first one of said diaphragms, a sensing transducer positioned within said second chamber and connected by means of spring means to a movable portion of said second flexible member to convert changes in displacement of said second flexible member into a force that is applied to said sensing transducer, a first fluid under pressure within the space between said first one of said diaphragms and its associated meter wall to a first outer wall of said first flexible member, to the outer wall of said second flexible member and to an area surrounding said sensing transducer, a passageway in said meter body to apply a second fluid under pressure within the space between said second diaphragm and its associated meter wall to the inside wall of said flexible members, and an overload valve passing through a passageway containing said second fluid and connected for movement with said first flexible member and wherein said chamber formed by said second flexible member is operable to relieve the pressure of either one of said fluids acting on said first flexible member whenever the pressure of either of said fluids approaches an overload pressure condition.

2. The differential pressure responsive apparatus comprising a meter body, a semi-conductor wafer positioned within said meter body having a resistive sensing element thereon to convert changes occurring in a relatively high and low incompressible fluid pressure under measurement into an electric output signal of proprotional magnitude, an overload valve having a soft and hard seat and positioned in a first chamber formed by a body portion of the meter, said overload valve being mounted for movement with a first flexible member forming a soft seat position to a hard seated sealed off position with the meter body to cut off low pressure fluid on a low pressure side of said meter from being applied to said first flexible member during a condition in which said high incompressible fluid pressure approaches an overload pressure level, a flexible compliance member mounted within an aperatured wall formed in another body portion of the meter, a spring means connecting the flexible compliance member to said wafer to convert changes in displacement of the compliance member resulting from a change in the differential pressure of the fluids under measurement acting thereon into a proportional force that is applied to said wafer, a second chamber formed by the internal wall of said compliance member, passageways in said body for simultaneously applying said low incompressible fluid pressure being applied to the internal wall of said first flexible member and to the internal wall of the second chamber to expand said flexible compliance member and thereby maintain the low pressure fluid at a level that will not impair the sensing and transmitting characteristics of the semi-conductor wafer and its associated resistive sensing element.

3. The apparatus as defined in claim 1 wherein the said sensing transducer is a wafer formed of a single crystal silicon material and said compliance member has a stop means associated therewith to limit its displacement during said overload pressure condition and to thereby limit the magnitude of force that the spring means transmits to the wafer to a level that is below the rupture level of the wafer.

4. The apparatus as defined in claim 2 wherein the resistive sensor is comprised of a fully active wheatstone bridge pattern and an adjustable stop means is mounted on said meter body to adjust the amount of movement that said flexible compliance member can be expanded or compressed by said high and low incompressible fluid pressures.

5. The apparatus as defined in claim 2 wherein a substantially motionless electrical connection extends between the resistive sensing element, through an electrical feed through member in the wall of the meter and through an electrical power transmitting circuit positioned outside the meter and wherein said compliance member has a stop means associated therewith to limit its displacement during said overload pressure condition and thereby limit the magnitude of force that the spring means transmits to the wafer to a level that is below the rupture level of the wafer.

6. The apparatus as defined in claim 2 wherein the overload valve has a second soft and hard seat for engagement with a portion of said meter body in a manner similar to but in a direction opposite to that in which said soft and hard seat of said overload valve is closed when the magnitude of the low pressure fluid being applied to the inner wall of said first flexible member exceeds an overload pressure condition and causes said first flexible member to expand, the expansion of said first flexible member being accompanied by a corresponding compression of said flexible compliance member as said low over load incompressible fluid pressure is applied thereto and an adjustable stop associated with a stationary base wall of said flexible compliance member is employed to limit the displacement of the flexible compliance member during the time when either one of said overload fluid pressure conditions are present.

7. The apparatus as defined in claim 2 wherein a portion of the wafer and its associated diffused resistive sensing element is supported by one end of a hollow block, a wall forming one of said cavities in said body surrounds and is in spaced apart relation with said block, a seal is mounted in an outer wall of the block and extends outwardly into contact with the wall forming said last mentioned cavity in the body, the open end of said flexible compliance member being supported by a wall portion that forms an aperature in the other end of the hollow block and said seal forming a fluid tight joint for separating said high incompressible fluid pressure acting on the sensor and the external surface of the compliance member from the low incompressible fluid pressure acting on the internal wall of the said compliance member.

8. The apparatus as defined in claim 1 wherein the said sensing transducer is a wafer formed of a single crystal silicon material and said second flexible member has a stop means associated therewith to limit its displacement during said overload pressure condition and to thereby limit the magnitude of force that the spring means transmits to the wafer to a level that is below the rupture level of the wafer, said second flexible member is a bellows, the spring means is of a coiled spring configuration having a first end fixedly connected to said wafer and its other end fixedly connected to a plate member forming a closed end of said second flexible bellows, a first stop member is connected for movement with said plate member, a second stop member is adjustably mounted in a fixed position on a plate on which the open end of said second flexible bellows is fixedly mounted, and said first stop member being operably positioned for movement toward and into non-movable engagement with said second stop member when the second flexible member is moved in one direction and said plate member forming the closed end of the bellows being operably positioned for movement toward and into non-movable engagement with said second stop member when the second flexible member is moved in an opposite direction.

9. The apparatus as defined in claim 2 wherein the wafer is of a single crystal silicon material in which said resistive sensing element is a doped piezoresistive pattern and said compliance member has a stop means associated therewith to limit its displacement during overload pressure condition and thereby limit the magnitude of force that the biasing means transmits to the wafer to a level that is below the rupture level of the wafer, and an insulated supporting means to support said compliance bellows, spring means and sensing element in electrically isolated contact with said meter body to thereby prevent leakage current passing from said wafer through said meter body to ground.

10. The apparatus as defined in claim 2 wherein the wafer is of a single crystal silicon material in which said resistive sensing element is a doped piezoresistive pattern and said compliance member has a stop means associated therewith to limit its displacement during said overload pressure condition and thereby limit the magnitude of force that the spring means transmits to the wafer to a level that is below the rupture level of the wafer, an insulated supporting means to support said compliance bellows, spring means and sensing element in electrically isolated contact with said meter body to thereby prevent leakage current passing from said wafer through said meter body to ground, and wherein the biasing means is of a U-shaped configuration.

* * * * *